(12) United States Patent
Tanaka et al.

(10) Patent No.: US 10,353,061 B2
(45) Date of Patent: Jul. 16, 2019

(54) SYSTEM AND METHOD FOR DETECTING TARGET OBJECT

(71) Applicant: Panasonic Intellectual Property Management Co., Ltd., Osaka (JP)

(72) Inventors: Toshiaki Tanaka, Kyoto (JP); Masaru Yamaoka, Osaka (JP); Kenji Masuda, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 274 days.

(21) Appl. No.: 15/181,565

(22) Filed: Jun. 14, 2016

(65) Prior Publication Data

US 2016/0377710 A1 Dec. 29, 2016

(30) Foreign Application Priority Data

Jun. 24, 2015 (JP) .................................. 2015-127099
Dec. 9, 2015 (JP) .................................. 2015-240532

(51) Int. Cl.
*G01S 13/04* (2006.01)
*G01S 13/86* (2006.01)
(Continued)

(52) U.S. Cl.
CPC .............. *G01S 13/04* (2013.01); *G01J 5/0025* (2013.01); *G01S 13/86* (2013.01); *G01S 13/886* (2013.01);
(Continued)

(58) Field of Classification Search
CPC .......... G01S 13/56; G01S 13/86; G01S 13/04; G01S 13/24; G01S 13/62; G01S 13/38;
(Continued)

(56) References Cited

U.S. PATENT DOCUMENTS 4,882,567 A 11/1989 Johnson
5,331,308 A * 7/1994 Buccola ............. G08B 13/2494
340/522
(Continued)

FOREIGN PATENT DOCUMENTS

CN 102681643 A 9/2012
EP 2058673 5/2009
(Continued)

OTHER PUBLICATIONS

The Extended European Search Report dated Nov. 21, 2016 for European Patent Application No. 16174698.7.
(Continued)

*Primary Examiner* — Olumide Ajibade Akonai
(74) *Attorney, Agent, or Firm* — Greenblum & Bernstein, P.L.C.

(57) ABSTRACT

A system for detecting a target object includes a first detector that detects an object by emitting radio waves and receiving reflected waves that are the emitted radio waves reflected by a target object, a second detector that detects heat generated by the target object, and an information collection apparatus that determines the presence or absence of the target object on the basis of the detected reflected waves and the detected heat, and the information collection apparatus determines the presence of the target object in a case where the first detector has detected a movement of the target object and the second detector has detected the heat.

8 Claims, 11 Drawing Sheets

(51) Int. Cl.
  *G01S 13/88* (2006.01)
  *G01J 5/00* (2006.01)
  *H04B 1/7075* (2011.01)
  *G01S 13/56* (2006.01)
  *G01S 13/62* (2006.01)
  *G01S 13/38* (2006.01)

(52) U.S. Cl.
  CPC .............. *G01S 13/38* (2013.01); *G01S 13/56* (2013.01); *G01S 13/62* (2013.01); *H04B 1/70751* (2013.01)

(58) Field of Classification Search
  CPC .. G08B 29/183; G08B 13/1645; G08B 29/26; G08B 13/19; H04B 1/70751
  See application file for complete search history.

(56) References Cited

U.S. PATENT DOCUMENTS

| | | | |
|---|---|---|---|
| 6,239,736 B1 | 5/2001 | McDonald et al. | |
| 6,351,234 B1* | 2/2002 | Choy | G01S 13/86 340/541 |
| 6,791,458 B2 | 9/2004 | Baldwin | |
| 7,026,601 B2* | 4/2006 | Tsuji | G01S 7/282 250/221 |
| 7,671,739 B2* | 3/2010 | Royer | G01S 13/56 340/539.23 |
| 8,389,924 B2* | 3/2013 | Stromberg | G08B 13/189 250/216 |
| 2005/0062601 A1* | 3/2005 | Tsuji | G01S 13/56 340/522 |
| 2005/0151647 A1* | 7/2005 | Alkelai | G08B 13/19 340/565 |
| 2006/0006882 A1* | 1/2006 | Tsuji | G01S 7/354 324/644 |
| 2008/0316025 A1* | 12/2008 | Cobbinah | A61B 5/1113 340/552 |
| 2009/0079564 A1* | 3/2009 | Wu | G01S 7/352 340/554 |
| 2009/0079615 A1* | 3/2009 | Wu | G01S 13/56 342/28 |
| 2016/0300479 A1* | 10/2016 | Modi | G08B 29/183 |

FOREIGN PATENT DOCUMENTS

| | | |
|---|---|---|
| EP | 2511618 | 10/2012 |
| GB | 2405762 | 3/2005 |
| JP | 2012-220114 | 11/2012 |

OTHER PUBLICATIONS

English Translation of Chinese Search Report dated Oct. 25, 2018 for the related Chinese Patent Application No. 201610172800.0.

* cited by examiner

SYSTEM AND METHOD FOR DETECTING TARGET OBJECT

BACKGROUND

1. Technical Field

The present disclosure relates to a detection system and a detection method for detecting a target object.

2. Description of the Related Art

Currently, systems that detect targets of detection such as objects or organisms (e.g., humans) are being developed into products. For example, a system that automatically turns on a light when a human body sensing sensor detects the approach of a human to the vicinity of the entrance of a door is being developed into a product.

There are various types of human body sensing sensors. For example, as thermal sensors that detect heat, there are infrared sensors and thermal image sensors. Further, there are radio wave sensors that emit radio waves and detect reflected radio waves.

Further, a technology that automatically adjusts the temperature of air conditioning when a human sensing sensor disposed in a room detects a human body is disclosed in Japanese Unexamined Patent Application Publication No. 2012-220114 (hereinafter referred to as "Patent Literature 1").

However, the technology described in Patent Literature 1 utilizes an infrared sensor that detects a change in heat source, and as such, goes so far as to detect the heat of sunlight falling onto the floor. For this reason, in a sunny room, heat may be detected even in the absence of a human.

Meanwhile, a radio wave sensor disposed in a room may not be able to accurately detect a human in a limited range, as the radio wave sensor goes so far as to detect a human in the next room, for example, by diffraction of radio waves.

SUMMARY

One non-limiting and exemplary embodiment provides a detection system that appropriately detects a target object.

In one general aspect, the techniques disclosed here feature a detection system including: a radio wave sensor that emits radio waves and detects reflected waves; a thermal sensor that detects heat generated by the target object; and an information collector that determines, on a basis of results of detection by the radio wave sensor and the thermal sensor, whether the target object is present.

The present disclosure makes it possible to appropriately detect a target object by utilizing a plurality of sensors that are different in detecting scheme from each other.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
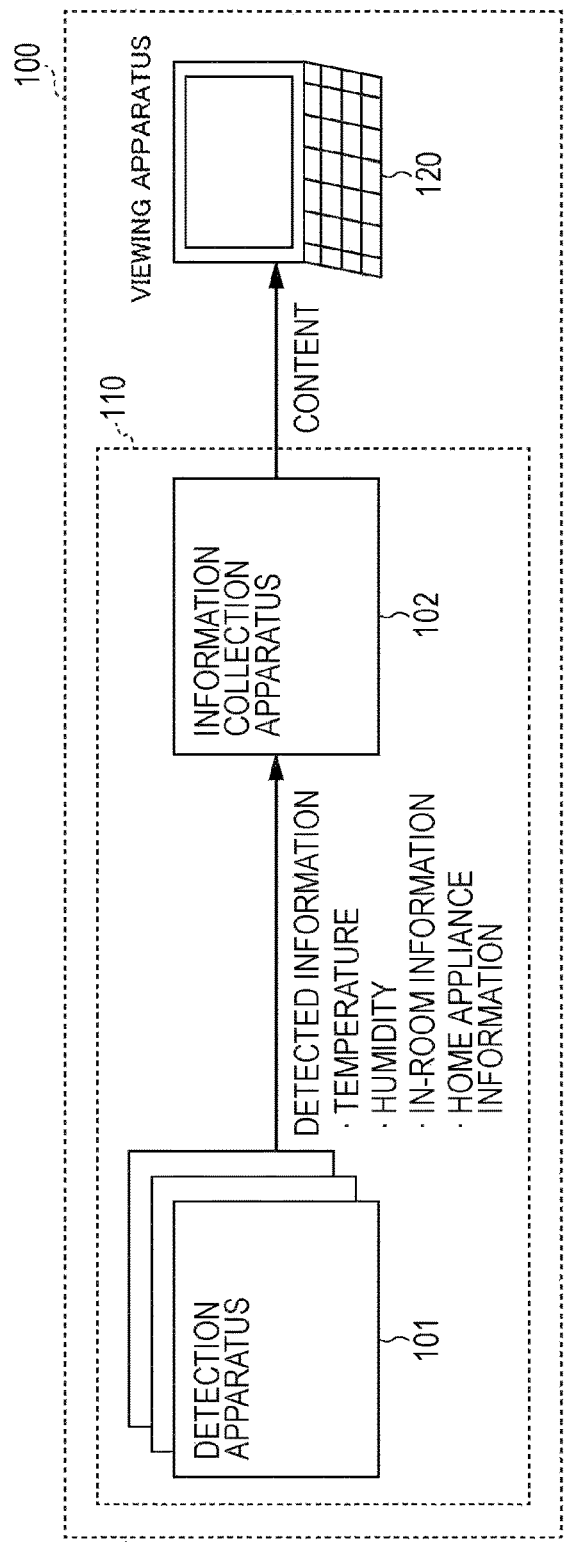
FIG. 1 is a diagram showing a detection system according to Embodiment 1.

One non-limiting and exemplary embodiment provides a detection system that appropriately detects a target object.

In one general aspect, the techniques disclosed here feature a detection system including: a radio wave sensor that emits radio waves and detects reflected waves on the basis of the detected reflected waves and the detected heat; a thermal sensor that detects heat generated by the target object; and an information collector that determines, on the basis of the detected reflected waves and the detected heat, whether the target object is present.

Further, in the detection system, when the information collector determines that the radio wave sensor has detected the target object and determines that the thermal sensor has detected the target object, the information collector determines that the target object is present.

Further, in the detection system, the thermal sensor is a thermal image sensor.

In one general aspect, the techniques disclosed here feature a system for detecting a target object, including: a radio wave sensor that emits radio waves and detects reflected waves that are the emitted radio waves reflected by a target object; a thermal image sensor that detects heat generated by the target object; and an information collector that determines, on the basis of the detected reflected waves and the detected heat, whether the target object is present, wherein the information collector turns on the thermal image sensor when the information collector determines that the radio wave sensor does not detect the target object.

Further, in the system, the information collector determines, after having turned on the thermal image sensor, that the thermal image sensor has detected the heat generated by the target object, the information collector determines that the target object is present.

Further, in one general aspect, the techniques disclosed here feature a method for detecting a target object, including: outputting detected information from a radio wave sensor that emits radio waves and detects reflected waves that are the emitted radio waves reflected by a target object; outputting detected information from a thermal sensor that detects heat generated by the target object; and causing an information collector to determine, on a basis of the detected information from the radio wave sensor and the detected information from the thermal sensor, whether the target object is present.

Further, in one general aspect, the techniques disclosed here feature a method for detecting a target object, including: outputting detected information from a radio wave sensor that emits radio waves and detects reflected waves that are the emitted radio waves reflected by a target object; outputting detected information from a thermal sensor that detects heat generated by the target object; and causing an information collector to determine that the target object is present when the information collector determines, on a basis of the detected information from the radio wave sensor and the detected information from the thermal sensor, that both the radio wave sensor and the thermal sensor have detected the target object.

Further, in one general aspect, the techniques disclosed here feature a method for detecting a target object, including: outputting detected information from a radio wave sensor that emits radio waves and detects reflected waves that are the emitted radio waves reflected by a target object; causing an information collector to turn on a thermal image sensor when the information collector determines, on a basis of the detected information from the radio wave sensor, that the radio wave sensor has not detected the target object; and causing the information collector to determine, on a basis of detected information from the thermal image sensor, whether the target object is present.

The present disclosure makes it possible to appropriately detect a target object by utilizing a plurality of sensors that are different in detecting scheme from each other.

Embodiments of the present disclosure are described below with reference to the drawings. It should be noted that the present disclosure is not limited by these embodiments.

Embodiment 1

FIG. 1 is a diagram showing a system for detecting a target object such as an object or an organism (e.g., a human) according to Embodiment 1.

A communication system 100 shown in FIG. 1 includes a detection system 110 and a viewing apparatus 120. Furthermore, the detection system 110 includes a detection apparatus 101 and an information collection apparatus 102.

The detection apparatus 101 includes sensors that detect a target object. Examples of these sensors include a radio wave sensor that emits radio waves and detects reflected radio waves and a thermal sensor such as an infrared sensor or a thermal image sensor.

The information collection apparatus 102 is a server or a personal computer.

The detection apparatus 101 and the information collection apparatus 102 are connected to each other by cable or wirelessly.

As a form of communication between the detection apparatus 101 and the information collection apparatus 102, a communication method such as serial communication, Wi-Fi (Wireless Fidelity) (registered trademark), Bluetooth (registered trademark), or RFID (radio-frequency identifier) may be used, provided the apparatuses can transmit and receive information to and from each other.

The detection apparatus 101 and the information collection apparatus 102 transmit and receive detected information such as temperature, humidity, in-room information, and home appliance information to and from each other. It should be noted that the detected information may include plural pieces of detected information or may include only the in-room information.

The in-room information is information that indicates whether a human is present in a room. Particularly, in the present embodiment, the in-room information is information that indicates whether a sensor has detected a human.

The home appliance information is information that indicates what state a home appliance is currently in. An example of the home appliance information is information that indicates what temperature an air conditioner is currently performing cooling operation at.

The information collection apparatus 102 and the viewing apparatus 120 are connected to each other wirelessly or by cable for communication, for example, of content.

In the system thus configured, the detection apparatus 101 transmits detected information to the information collection apparatus 102, and the information collection apparatus 102 creates content on the basis of the detected information thus received and transmits the content to the viewing apparatus 120. This allows a user to view, on the viewing apparatus 120, information indicating whether a human is present in a room, air temperature, or any other piece of information.

Next, the detection apparatus 101 is described in detail.

Figure 2:
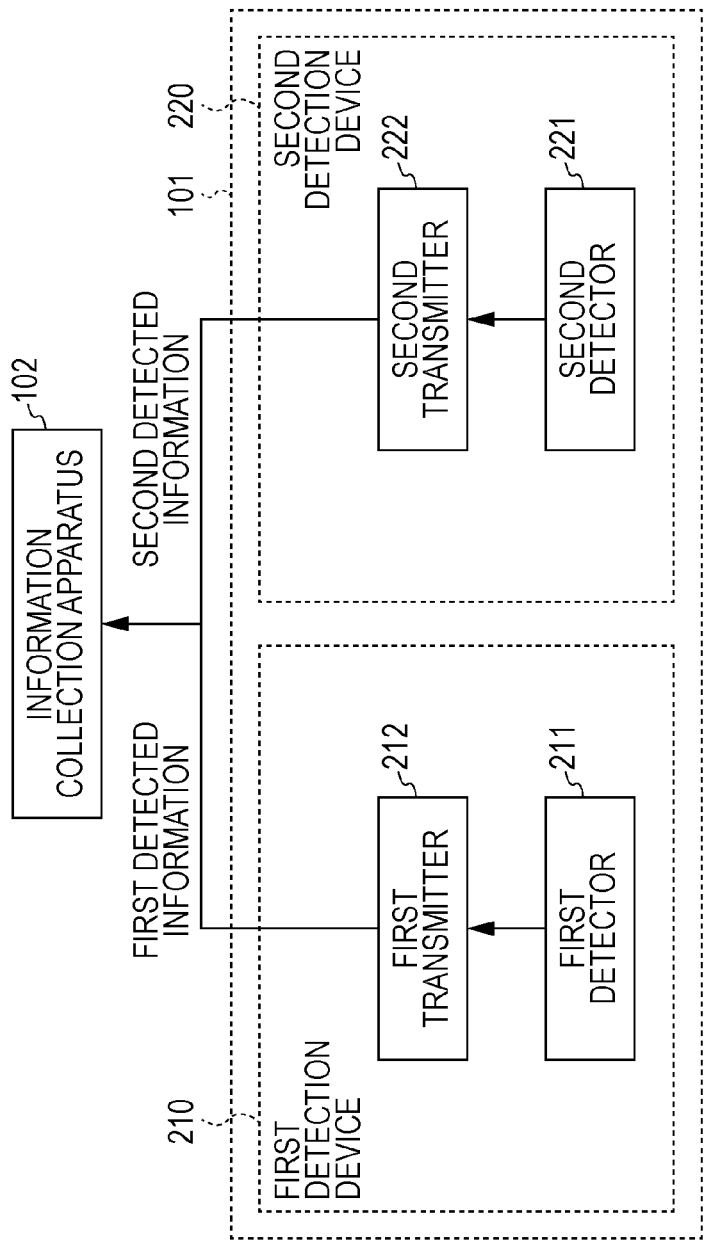
FIG. 2 is a system block diagram according to Embodiment 1.

FIG. 2 is a block diagram of the detection apparatus 101.

As shown in FIG. 2, the detection apparatus 101 includes a first detection device 210 and a second detection device 220.

The first detection device 210 includes a first detector 211 and a first transmitter 212.

The first detector 211 is for example a radio wave sensor.

The first transmitter 212 transmits information detected by the first detector 211 to the information collection apparatus 102 wirelessly or by cable. For example, the first transmitter 212 transmits information to the information collection apparatus 102 to the effect that the first detector 211 has detected or has not detected a target object.

The second detection device 220 includes a second detector 221 and a second transmitter 222.

The second detector 221 is a thermal sensor such as an infrared sensor or a thermal image sensor.

The second transmitter 222 transmits information detected by the second detector 221 to the information collection apparatus 102 wirelessly or by cable. For example, the second transmitter 222 transmits information to the information collection apparatus 102 to the effect that the second detector 221 has detected or has not detected a target object.

Next, an example of detection of a target object by the first detection device 210 and the second detection device 220 is described with reference to FIG. 3.

Figure 3:
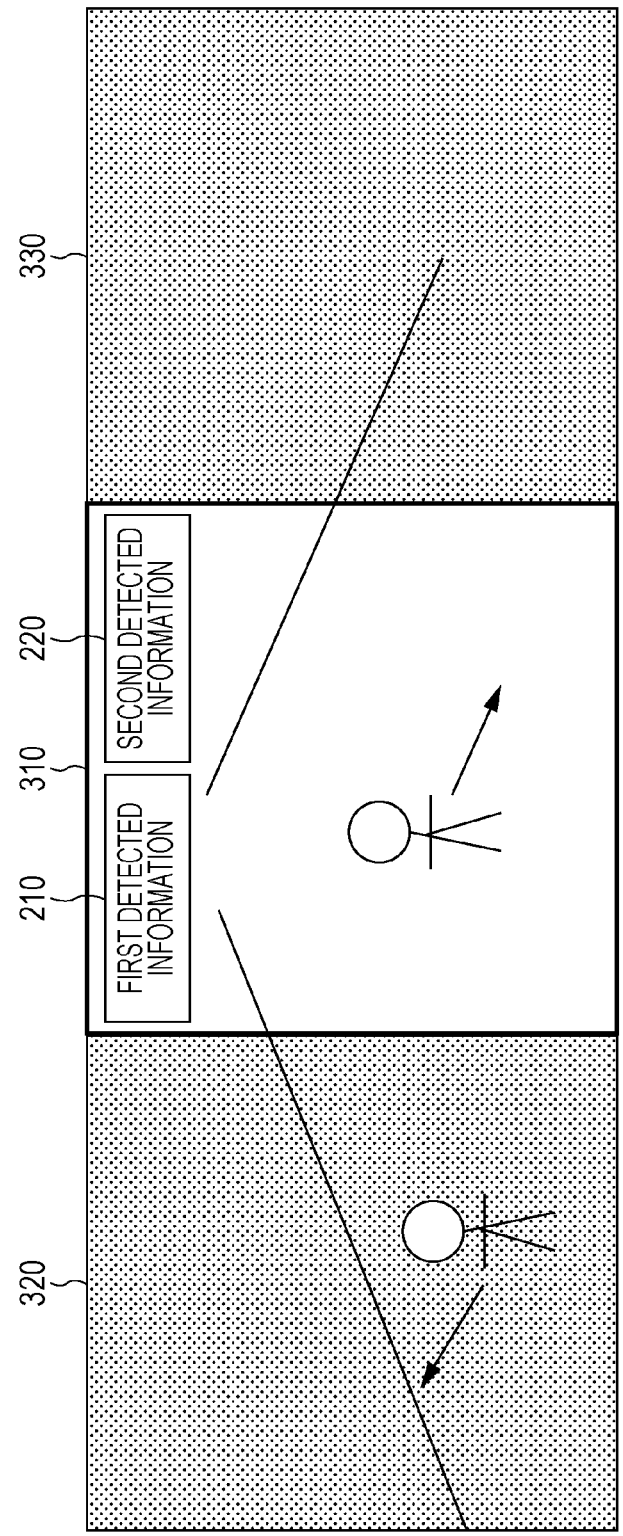
FIG. 3 is a diagram showing a range of detection according to Embodiment 1.

FIG. 3 is a diagram showing a range of detection by the first detection device 210 and the second detection device 220.

The first detection device 210 is a radio wave sensor that detects a nearby target object by emitting radio waves and receiving reflected waves from the target object.

The second detection device 220 is an infrared sensor that detects heat emitted by a target object.

The infrared sensor detects a change in heat source, and as such, also detects a change in heat source caused, for example, by sunlight. On the other hand, the radio wave sensor can detect a finer movements than the infrared sensor can, but may detect a movement outside of a desired range of detection.

In FIG. 3, ranges 310, 320, and 330 indicate rooms each surrounded, for example, by walls. The first detection device 210, which is the radio wave sensor, detects a human with radio waves passing around the walls, for example, by diffraction. For this reason, the first detection device 210 can detect a human beyond the range 310.

On the other hand, the second detection device 220, which is the infrared sensor, is not capable of detection beyond the range 310, as infrared rays propagate only in a line of sight.

Figure 4:
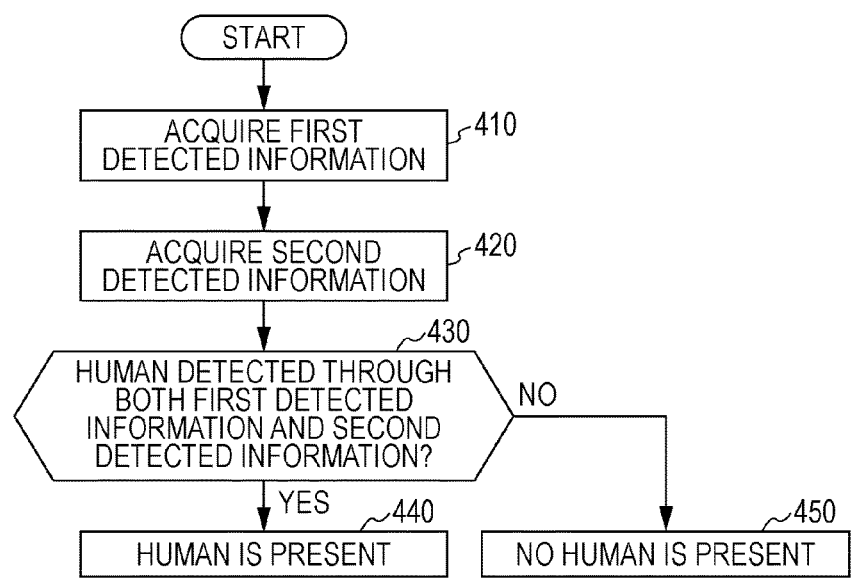
FIG. 4 is a flow chart showing a detection method according to Embodiment 1.

FIG. 4 is a flow chart showing a method for detecting a human.

A method for detecting a human according to Embodiment 1 is described below.

It should be noted that Embodiment 1 takes a human as an example of a target to be detected. The target object is not limited to a human, but may for example be an organism, such as an animal, or an object.

The information collection apparatus 102 acquires first detected information from the first detection device 210 (step 410).

Then, the information collection apparatus 102 acquires second detected information from the second detection device 220 (step 420).

The information collection apparatus 102 determines whether a human has been detected through both the first detected information and the second detected information (step 430).

If the information collection apparatus 102 determines in step 430 that a human has been detected through both the first detected information and the second detected information, the information collection apparatus 102 determines that the human is present in a desired range (step 440). If not so, the information collection apparatus 102 determines that no human is present in the desired range (step 450).

Thus, in Embodiment 1, if the information collection apparatus 102 determines that both the first detection device 210 and the second detection device 220 have detected a human, the information collection apparatus 102 determines that the human is present in the desired range. Therefore, this method achieves higher detection accuracy than does a conventional method for detection by one type of sensor.

Embodiment 2

Next, Embodiment 2 is described.

Embodiment 2 differs from Embodiment 1 in that while Embodiment 1 uses an infrared sensor, Embodiment 2 uses a thermal image sensor.

Further, the information collection apparatus 102 has a function of receiving detected information from a thermal image sensor 521 via a second transmitter 522 and determining which part is low in temperature or which part is high in temperature.

The whole system is identical in other respects to that of Embodiment 1, and as such, is not described here.

It should be noted that Embodiment 2 takes a human as an example of a target to be detected. The target object is not limited to a human, but may for example be an organism, such as an animal, or an object.

Figure 5:
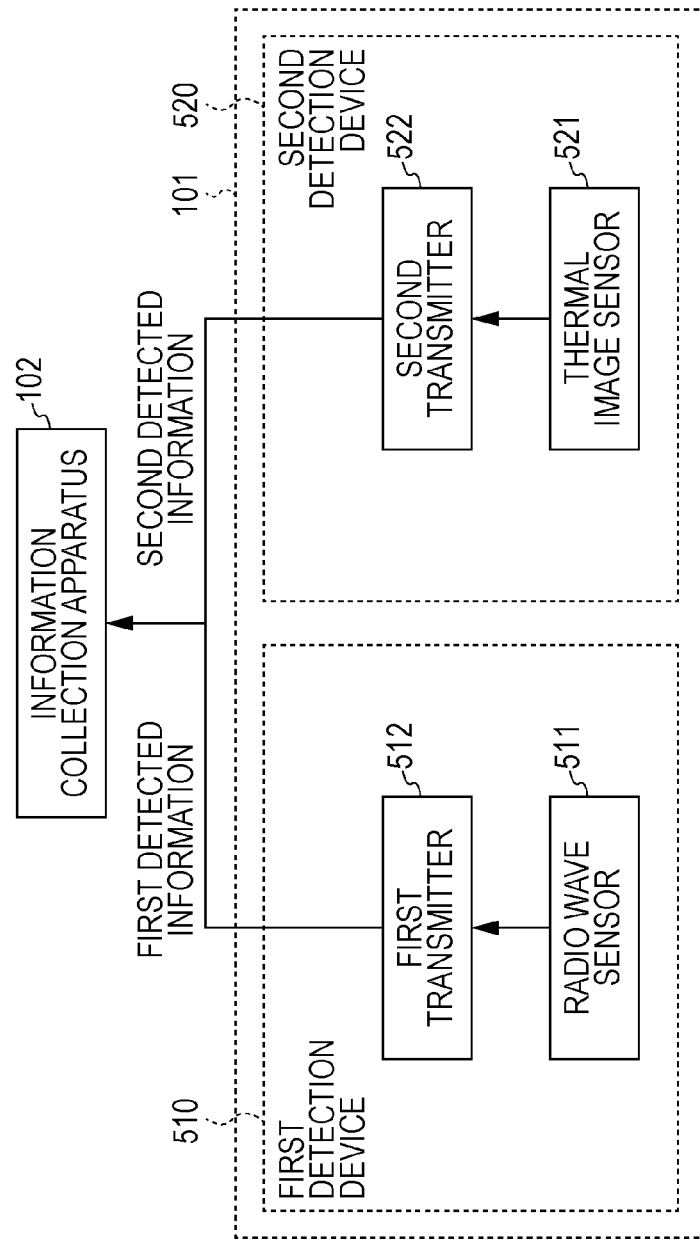
FIG. 5 is a system block diagram according to Embodiment 2.

FIG. 5 is a system block diagram of the detection apparatus 101 and the information collection apparatus 102 according to Embodiment 2.

As shown in FIG. 5, the detection apparatus 101 includes a first detection device 510 and a second detection device 520. For example, the first detection device 510 includes a radio wave sensor 511, and the second detection device 520 includes the thermal image sensor 521.

The thermal image sensor 521 is a sensor that divides a range of detection into a plurality of ranges and detects temperature in each of the ranges.

The information collection apparatus 102 can automatically recognize, from detected information from the thermal image sensor 521, in which range the temperature has been detected. This makes it possible, for example, to determine the presence of a human upon determining detection of heat in a part excluding a range onto which sunlight falls.

An alternative configuration may be such that detection is performed only in a range of a futon on which a human sleeps every day.

Figure 6:
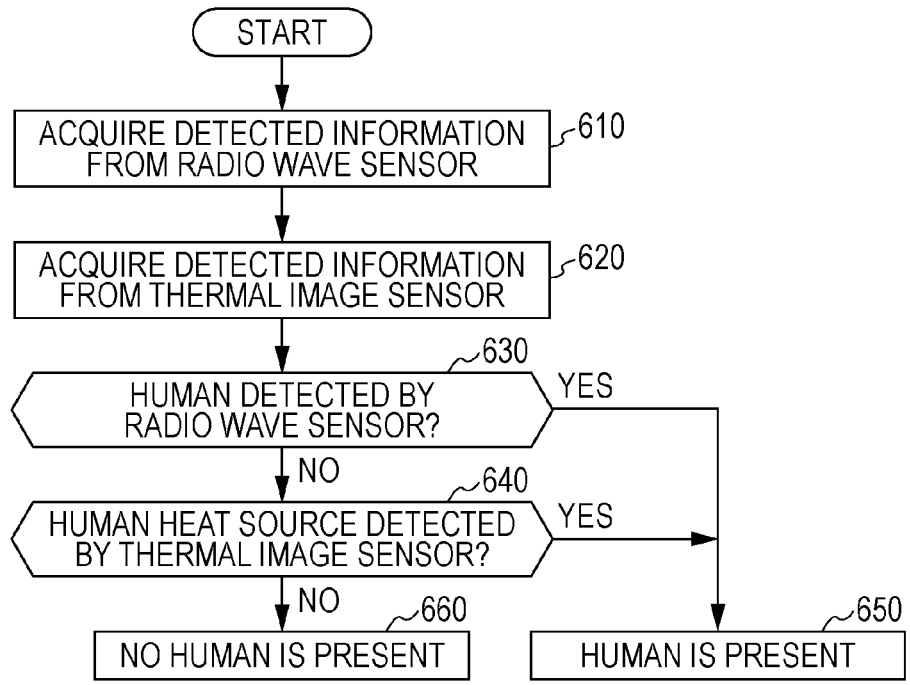
FIG. 6 is a flow chart showing a detection method according to Embodiment 2.

FIG. 6 is a flow chart showing a method for detecting a human according to Embodiment 2.

Next, the operation of the system of Embodiment 2 is described with reference to FIGS. 5 and 6.

First, in step 610, the information collection apparatus 102 acquires detected information from the radio wave sensor 511 as detected by the first detection device 510. Specifically, the information collection apparatus 102 receives, from a first transmitter 512, detected information detected by the radio wave sensor 511, e.g., information indicating that the radio wave sensor 511 has detected or has not detected a target object (e.g., a human).

Next, in step 620, the information collection apparatus 102 acquires detected information from the thermal image sensor 521 as detected by the second detection device 520. Specifically, the information collection apparatus 102 receives, from a second transmitter 522, information indicating that the thermal image sensor 521 has detected or has not detected heat.

If, in step 630, the information collection apparatus 102 determines, from the result of detection by the radio wave sensor 511 that the information collection apparatus 102 received in step 610, that the radio wave sensor 511 has detected a human, the information collection apparatus 102 determines that the human is present (step 650). On the other hand, if the information collection apparatus 102 determines that the radio wave sensor 511 has not detected a human, the information collection apparatus 102 proceeds to step 640.

Next, if, in step 640, the information collection apparatus 102 determines, from the result of detection by the thermal image sensor 521 that the information collection apparatus 102 received in step 620, that the thermal image sensor 521 has detected a human, the information collection apparatus 102 determines that the human is present (step 650). On the other hand, if the information collection apparatus 102 determines that the thermal image sensor 521 has not detected heat, the information collection apparatus 102 determines in step 660 that no human is present.

More specifically, if, in step 640, the information collection apparatus 102 determines, from the result of detection by the thermal image sensor 521 that the information collection apparatus 102 received in step 620, that the thermal image sensor 521 has detected heat in a range excluding a predetermined range, the information collection apparatus 102 determines that the thermal image sensor 521 has detected a human.

It should be noted that the predetermined region is a region onto which sunlight falls or a range excluding a bed or a futon.

In Embodiment 2, in a case where the radio wave sensor 511 cannot detect a human in step 630 because the human is sleeping, and if, in step 640, the thermal image sensor 521 detects heat in a range excluding a range onto which sunlight falls, the information collection apparatus 102 determines that the human is present.

Alternatively, if, in step 640, the thermal image sensor 521 detects heat in a range, such as a bed or a futon, where a human is present while the human is sleeping, the information collection apparatus 102 determines that the human is present.

Thus, in Embodiment 2, even in a case where the radio wave sensor 511 cannot detect a human because the human is a state such as sleeping, the human can be detected with use of the thermal image sensor 521.

Further, the use of the thermal image sensor 521 makes it possible to detect heat in a limited area, thus making it possible to accurately detect a human even in a state where the human is sleeping.

In Embodiment 2, the information collection apparatus 102 acquires the results of detection from the sensors in steps 610 and 620, respectively. This operation may be performed either regularly or in response to an action performed by the user.

The detected information from the thermal image sensor 521 can be displayed on a display such as the viewing apparatus 120 with a high-temperature area indicated by red or any other color and a low-temperature area indicated by green, blue, or any other color. This enables the user to recognize at a glance which part is low or high in temperature.

Embodiment 3

Figure 7:
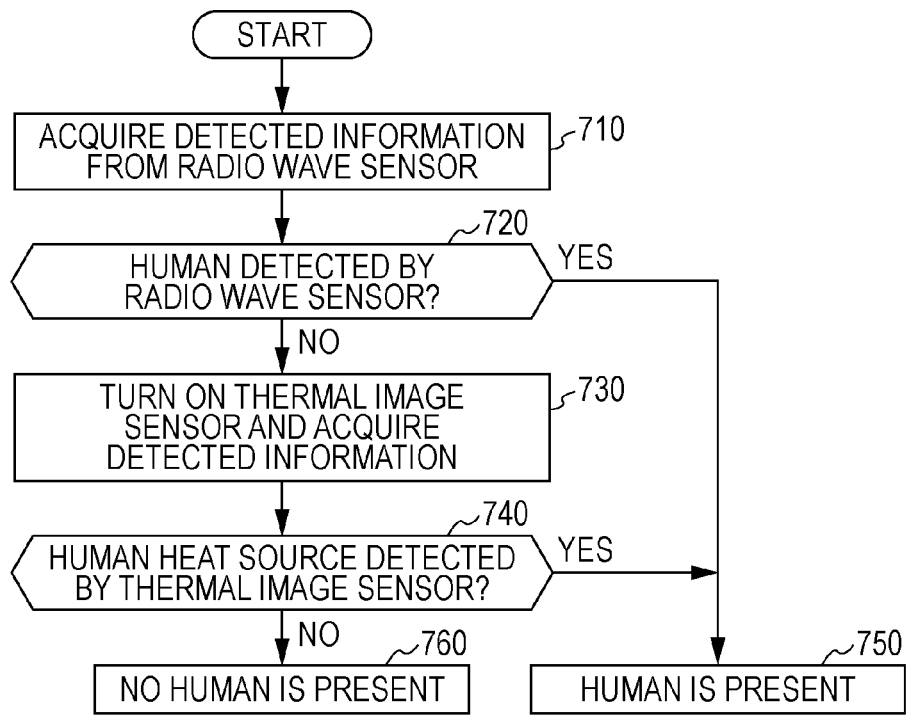
FIG. 7 is a flow chart showing a detection method according to Embodiment 3.

FIG. 7 is a flow chart showing a method for detecting a human according to Embodiment 3.

In Embodiment 3, at least one of the two sensors, i.e., the thermal image sensor 521, is not always on, and the thermal image sensor 521 is turned on when the radio wave sensor 511 did not detect a human. This allows the thermal image sensor 521 to consume less power.

The system configuration of Embodiment 3 is identical to that of Embodiment 2, and as such, is not described here.

The operation of the system of Embodiment 3 is described with reference to FIG. 7.

In step 710, the information collection apparatus 102 acquires detected information from the radio wave sensor 511 as detected by the first detection device 510. Specifically, the information collection apparatus 102 receives, from the first transmitter 512, detected information detected by the radio wave sensor 511. At this point in time, the thermal image sensor 521 is off.

If the information collection apparatus 102 determines in step 720 that the radio wave sensor 511 has detected a human, the information collection apparatus 102 determines that the human is present (step 750). On the other hand, if the information collection apparatus 102 determines in step 720 that the radio wave sensor 511 has not detected a human, the information collection apparatus 102 proceeds to step 730 to turn on the second detection device 520 and acquire detected information from the thermal image sensor 521.

Specifically, the information collection apparatus 102 transmits a start-up instruction signal to the thermal image sensor 521 via the second transmitter 522, and the thermal image sensor 521 gets started running. The thermal image sensor 521 transmits detected information to the information collection apparatus 102 via the second transmitter 522.

Next, if the information collection apparatus 102 determines in step 740 that the thermal image sensor 521 of the second detection device 520 has detected a heat source, the information collection apparatus 102 determines that a human is present (step 750).

On the other hand, if the information collection apparatus 102 determines in step 740 that the thermal image sensor 521 has not detected a heat source, the information collection apparatus 102 determines that no human is present (step 760).

Specifically, upon receiving, from the thermal image sensor 521 via the second transmitter 522, detected information indicating that the thermal image sensor 521 has not detected a heat source, the information collection apparatus 102 determines that no human is present.

Alternatively, the information collection apparatus 102 may be configured to, unless the information collection apparatus 102 receives detected information from the thermal image sensor 521 via the second transmitter 522, determine that no human in present.

It should be noted that the acquisition of such detected information from the radio wave sensor 511 in step 710 may be performed either regularly or in response to an instructive action performed by the user.

In Embodiment 3, the thermal image sensor 521 is turned on only in a case where the radio wave sensor 511 does not detect a human. This allows the thermal image sensor 521 to consume less power than it does in a case where it is always on.

Embodiment 4

Next, Embodiment 4 is described.

In Embodiment 4, when both the radio wave sensor 511 and the thermal image sensor 521 detect a human, the information collection apparatus 102 determines that the human is present.

Figure 8:
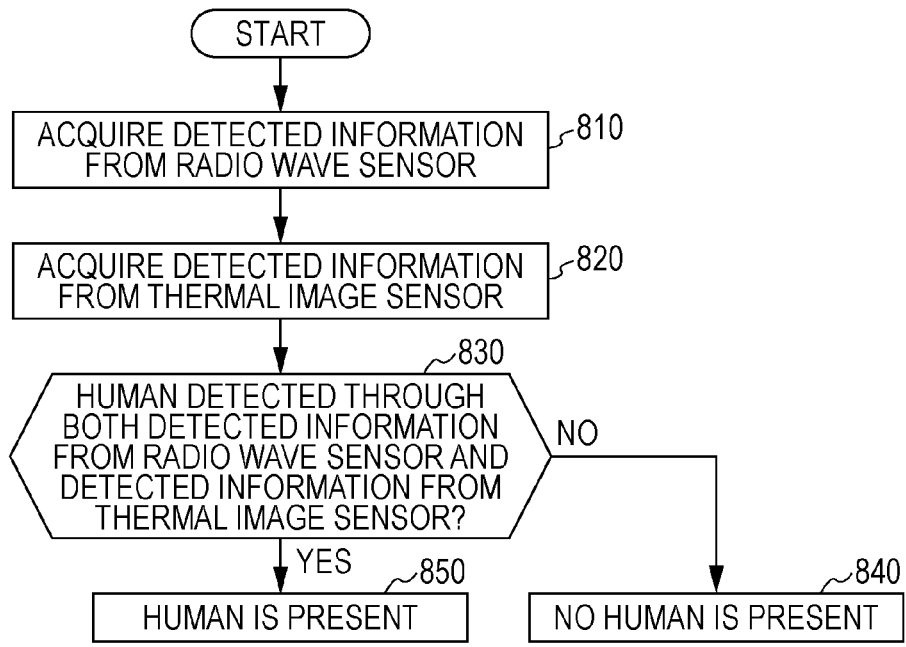
FIG. 8 is a flow chart showing a detection method according to Embodiment 4.

FIG. 8 is a flow chart showing a method for detecting a human according to Embodiment 4.

The system configuration of Embodiment 4 is identical to that of Embodiment 3, and as such, is not described here.

First, in step 810 of FIG. 8, the information collection apparatus 102 acquires detected information from the radio wave sensor 511 as detected by the first detection device 510. Specifically, the first transmitter 512 transmits, to the information collection apparatus 102, detected information detected by the radio wave sensor 511, i.e., information indicating the radio wave sensor 511 has detected or has not detected a human.

Next, in step 820, the information collection apparatus 102 acquires detected information from the thermal image sensor 521 as detected by the second detection device 520. Specifically, the second transmitter 522 transmits, to the information collection apparatus 102, detected information detected by the thermal image sensor 521, i.e., information indicating that the thermal image sensor 521 has detected or has not detected heat.

If the information collection apparatus 102 determines in step 830 that a human has been detected through both the detected information from the radio wave sensor 511 and the detected information from the thermal image sensor 521, the information collection apparatus 102 determines that the human is present (step 850).

On the other hand, if the information collection apparatus 102 determines in step 830 that no human is detected through both the detected information from the radio wave sensor 511 and the detected information from the thermal image sensor 521, the information collection apparatus 102 determines that no human is present (step 840).

Thus, in Embodiment 4, when both the radio wave sensor 511 and the thermal image sensor 521 detect a human, the information collection apparatus 102 determines that the human is present. This makes false detection less likely to occur than it does in a case where one type of sensor is used, thus making it possible to more surely detect the presence of a human.

Embodiment 5

Next, Embodiment 5 is described.

Embodiment 5 makes it possible to change the algorithm in Embodiment 4 for determining the presence or absence of a target object (e.g., a human) by the thermal image sensor 521.

Figure 9:
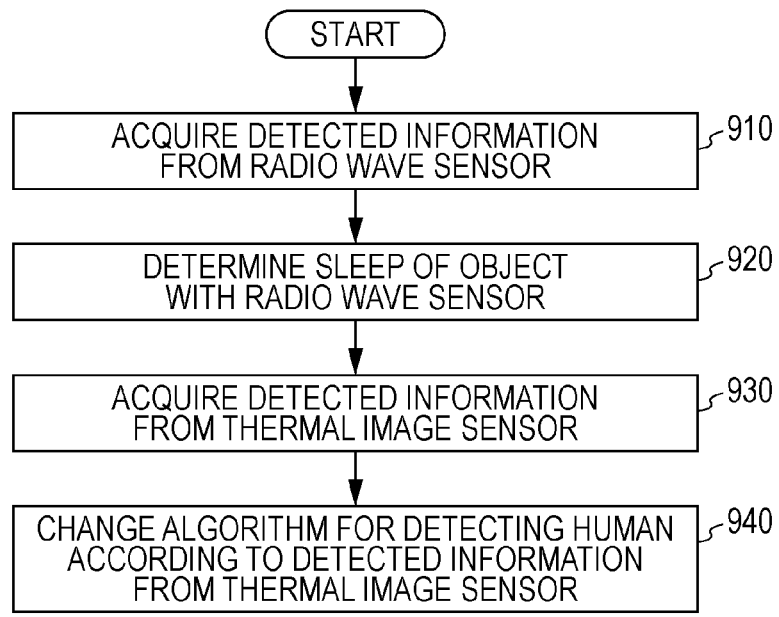
FIG. 9 is a flow chart showing a detection method according to Embodiment 5.

FIG. 9 is a flow chart showing the operation of a system of Embodiment 5.

First, in step 910, the information collection apparatus 102 acquires detected information from the radio wave sensor 511. Specifically, the information collection apparatus 102 receives, from the first transmitter 512, detected information detected by the radio wave sensor 511.

Next, in step 920, the information collection apparatus 102 determines, on the basis of the detected information from the radio wave sensor 511, whether a human is asleep.

Specifically, if the information collection apparatus 102 determines, on the basis of the detected information from the radio wave sensor 511, that the human is moving, the information collection apparatus 102 determines that the human is not asleep. On the other hand, if the information collection apparatus 102 determines that the human is not moving, the information collection apparatus 102 determines that the human is asleep.

At this point in time, the radio wave sensor 511 may output detected information indicating that the radio wave sensor 511 has detected the human on the basis of a change in radio waves received. Alternatively, the radio wave sensor 511 may output information indicating a change in radio waves received, and the first transmitter 512 may output, to the information collection apparatus 102, detected information indicating that the radio wave sensor 511 has detected the human.

In step 930, the information collection apparatus 102 acquires detected information from the thermal image sensor 521 as detected by the second detection device 520. Specifically, the information collection apparatus 102 receives, from the second transmitter 522, detected information detected by the thermal image sensor 521.

Next, in step 940, the information collection apparatus 102 changes the algorithm for detecting a human according to the detected information that the information collection apparatus 102 acquired in step 930.

Next, an example of the change to the algorithm in step 940 of FIG. 9 is described with reference to FIG. 10.

Figure 10:
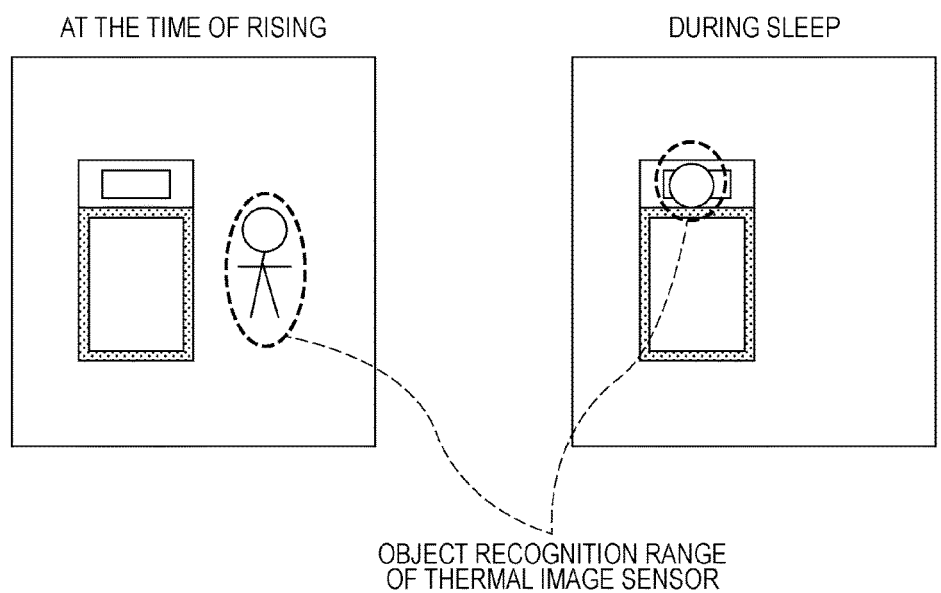
FIG. 10 is a diagram for explaining the detection method according to Embodiment 5.

The term "change to the algorithm" here means changing between using one range of detection of a target object at the time of rising and using another range of detection of the target object during sleep, for example, as shown in FIG. 10.

For example, in the case of detection of a human, the thermal image sensor 521 can sense the temperature of the whole body of the human, as the human gets out of futon at the time of rising. Therefore, the thermal image sensor 521 can detect a human-sized heat source as surrounded by dotted lines in FIG. 10.

For this reason, when the thermal image sensor 521 detects a human-sized heat source, the information collection apparatus 102 can determine that a human is present.

Meanwhile, in a case where the human covers him- or herself with a futon during sleep, the thermal image sensor 521 can sense the temperature of the head only. Therefore, in a case where the thermal image sensor 521 has detected a head-sized heat source, the information collection apparatus 102 determines that the human is present.

In this way, the algorithm for detecting a target object is changed so that the range of detection by the thermal image sensor 521 is expanded in a state where the thermal image sensor 521 can sense the temperature of the whole body of a human and the thermal image sensor 521 is narrowed in a case where the thermal image sensor 521 has detected a head-sized heat source.

It should be noted that the detection algorithm of the thermal image sensor 521 may be changed either during sleep or at the time of rising.

Next, an example of a case where the detection algorithm is changed at the time of rising is described.

Figure 11:
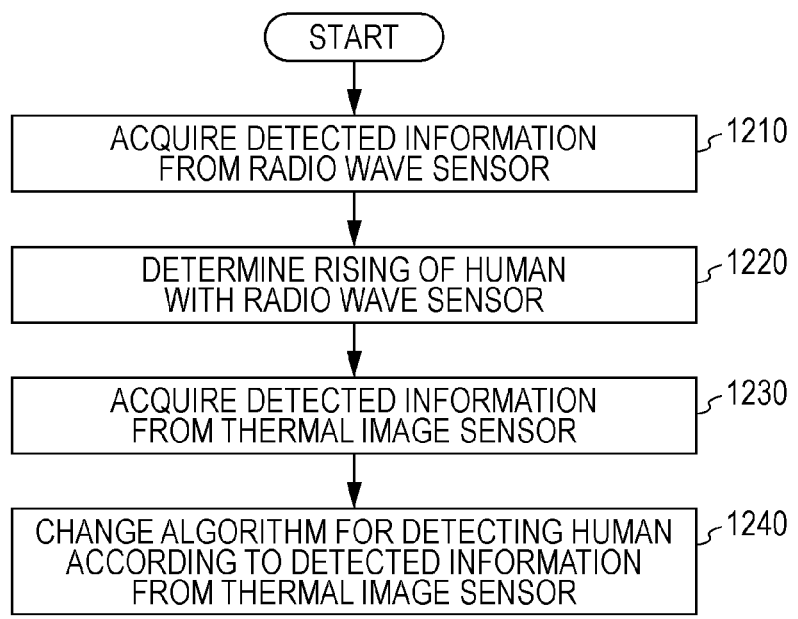
FIG. 11 is a flow chart showing the detection method according to Embodiment 5.

FIG. 11 is a flow chart showing an operation in which the detection algorithm is changed at the time of rising.

First, in step 1210, the information collection apparatus 102 acquires detected information from the radio wave sensor 511 as detected by the first detection device 510. Specifically, the information collection apparatus 102 receives, from the first transmitter 512, detected information detected by the radio wave sensor 511.

Next, in step 1220, the information collection apparatus 102 determines, on the basis of the detected information from the radio wave sensor 511, whether a human is arise.

At this point in time, if the information collection apparatus 102 determines, on the basis if the detected information from the radio wave sensor 511, that the human is moving, the information collection apparatus 102 determines that the human is not asleep. On the other hand, if the information collection apparatus 102 determines that the human is not moving, the information collection apparatus 102 determines that the human is asleep.

In step 1230, the information collection apparatus 102 acquires detected information from the thermal image sensor 521 as detected by the second detection device 520. Specifically, the information collection apparatus 102 receives, from the second transmitter 522, detected information detected by the thermal image sensor 521.

In step 1240, the information collection apparatus 102 changes the algorithm for detecting a target object according to the detected information that the information collection apparatus 102 acquired in step 1230.

It should be noted that a determination of whether a human is asleep or arise is not simply limited to whether the human is moving. For example, such a determination may be made by an algorithm for determining the state of sleep. Examples of such an algorithm include Cole's algorithm and AW2 algorithm.

For example, in a case where the thermal image sensor 521 has determined that the human is on the bed and a state in which only a certain movement is detected by the radio wave sensor 511 has continued for a certain period of time, the information collection apparatus 102 may determine that the human is asleep.

For example, the information collection apparatus 102 may determine the state of sleep from the respiratory rate or pulse rate counted by the radio wave sensor 511.

For example, when the radio wave sensor 511 has detected a certain period of certain movement, the information collection apparatus 102 may determine that the human is arise.

Next, a method for detecting an object with the thermal image sensor 521 is described.

Figure 12:
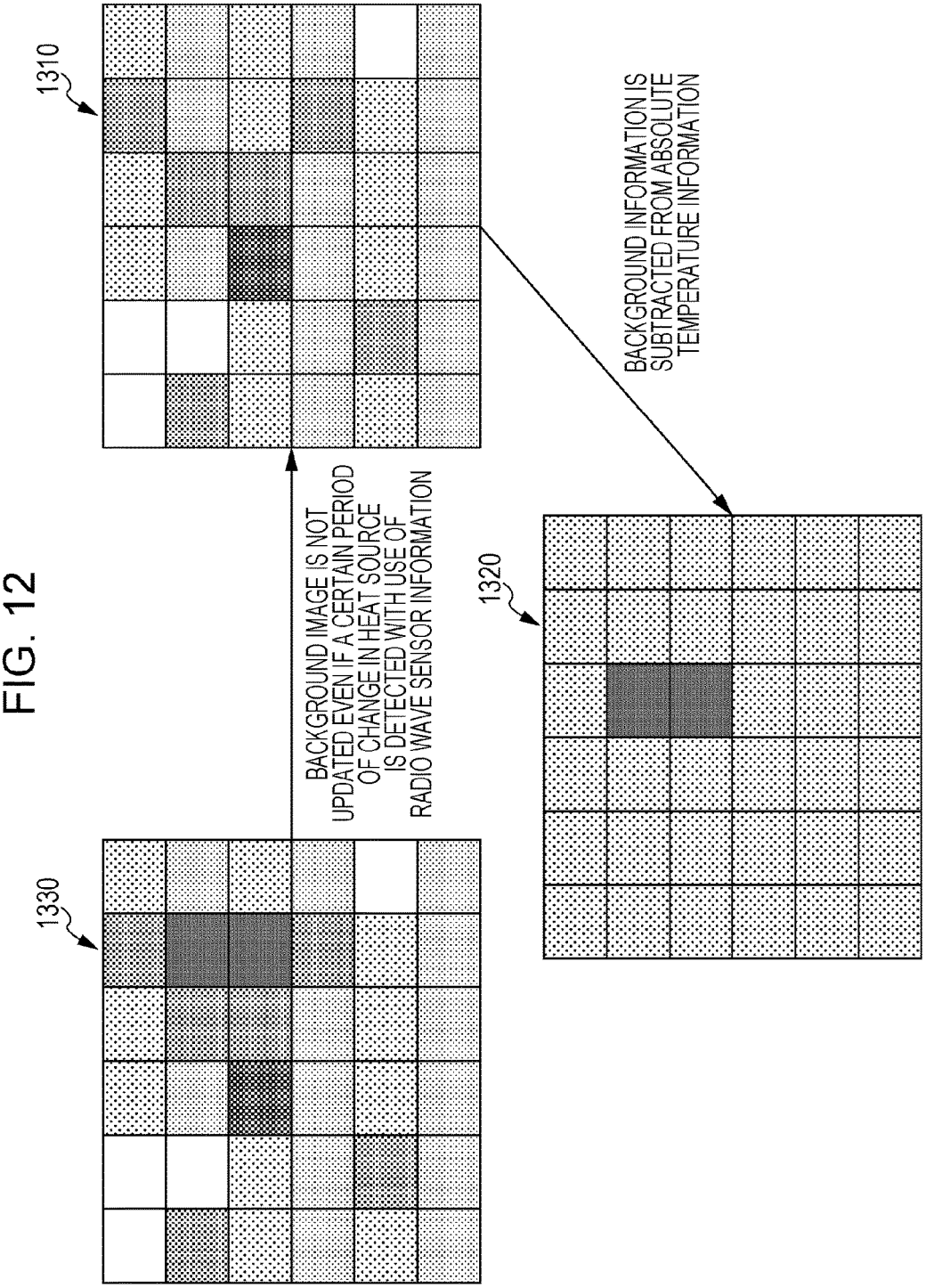
FIG. 12 is a diagram showing images for explaining the detection method according to Embodiment 5.

FIG. 12 is a diagram for explaining the method for detecting an object with the thermal image sensor 521.

The thermal image sensor 521 treats, as a background image (1310), a static state in which there is no heat source to be detected, forms a heat source detection image (1320) by subtracting temperature information of the background image from absolute temperature information (1330) held and sensed, and thereby determines the presence or absence of a heat source.

The background image is updated at regular time intervals for updates on the static state of the heat source.

However, in a case where the heat source remains still for a certain period of time, e.g., while the human is sleeping, the heat source is determined as the background image, and the detected object is treated as the background image, too.

Therefore, in a case where an object has been detected by the radio wave sensor 511, control is exercised so that the heat source of the detected object is not treated as the background image.

For example, detected information from the first detection device 510 including the radio wave sensor 511 may contain a range of positon of an object, and the information collection apparatus 102 may determine, on the basis of the range of position of the object, a range of position which is not treated as the background image and on the basis of which the thermal image sensor 521 may be controlled.

With this, a moving target object such as a human is not treated as the background image, while a change in heat source caused by sunlight streaming in through a window can be treated as the background image.

It should be noted that the radio wave sensor 511 may be configured to make a correction as to whether the heat source of the detected object blends into the background image of the thermal image sensor 521.

As described above, Embodiment 5 makes it possible to detect a human with use of a detection algorithm most suitable to detecting a human, thus making it possible to detect a human with higher accuracy than in the case of a fixed detection algorithm.

Embodiment 6

Embodiment 6 describes an example of a case where a pyroelectric sensor is used.

It should be noted that Embodiment 6 takes a human as an example of a target to be detected. The target object is not limited to a human, but may for example be an organism, such as an animal, or an object.

Figure 13:
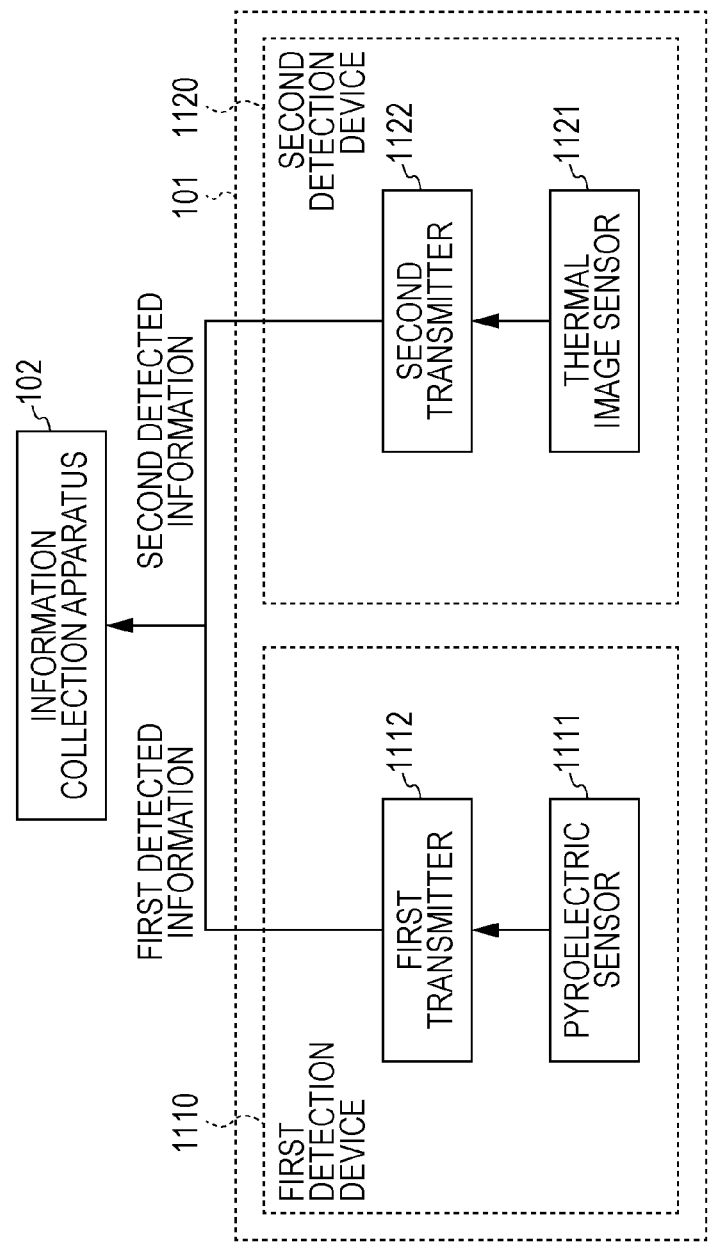
FIG. 13 is a system block diagram according to Embodiment 6.

As shown in FIG. 13, the detection apparatus 101 includes a first detection device 1110 and a second detection device 1120. For example, the first detection device 1110 includes a pyroelectric sensor 1111, and the second detection device 1120 includes a thermal image sensor 1121.

The first detection device 1110 includes the pyroelectric sensor 1111 and a first transmitter 1112. Further, the second detection device 1120 includes the thermal image sensor 1121 and a second transmitter 1122.

A result of detection by the pyroelectric sensor 1111 is transmitted to the information collection apparatus 102 via the first transmitter 1112.

A result of detection by the thermal image sensor 1121 is transmitted to the information collection apparatus 102 via the second transmitter 1122.

Thus, Embodiment 6 detects a human with use of two sensors, i.e., the pyroelectric sensor 1111 and the thermal image sensor 1121, thus making it possible to reduce the possibility of false detection of the presence of a human.

As describes above, the present embodiment detects a human with use of two sensors that are different in sensing scheme from each other, thus making it possible to more surely detect the presence or absence of a human than in a case where one type of sensor is used.

It should be noted the present embodiment may be configured as follows:

While, in the present embodiment, the information collection apparatus 102 and the detection apparatus 101 are configured by separate blocks, the information collection apparatus 102 and the detection apparatus 101 may be configured to be integrated with each other.

Further, while the detection apparatus 101 is described as including an infrared sensor and a radio wave sensor, the detection apparatus 101 may include any type of sensor.

Further, while the use of two sensors has been described, three or more sensors may be used.

Further, the second detector 221 may be a sensor that detects a target object by taking an image of the target object. In this case, the present embodiment may be configured such that in a case where the second detector 221 has determined that there is a target object by the first detector 211, it is determined, regardless of a result of determination by the first detector 211, that the target object is present in the range of detection by the first detection device 210.

Further, the present embodiment may be configured such that in a case where the information collection apparatus 102 has determined that no target object is present, the information collection apparatus 102 notifies the viewing apparatus 120 accordingly.

Further, the present embodiment may be configured such that in a case where the information collection apparatus 102 has determined that no target object is present, the information collection apparatus 102 locks the door and the like.

Further, the present embodiment may be configured such that in a case where the information collection apparatus 102 has determined, on the basis of results of detection by the sensors, that a human is sleeping, the information collection apparatus 102 exercises control such as the control of turning down the volume of a television in the next room and/or the control of powering off a television in his/her room.

The present disclosure makes it possible to appropriately detect a target object by utilizing a plurality of sensors that are different in detecting scheme from each other.

What is claimed is:

1. A system for detecting a target object comprising:
   a radio wave sensor that emits radio waves and detects reflected waves that are the emitted radio waves reflected by a target object;
   a thermal image sensor that detects heat generated by the target object; and
   a processor performs operations including:
   acquiring the reflected waves detected by the radio wave sensor, while the thermal image sensor is OFF;
   determining, on the basis of the acquired reflected waves detected by the radio wave sensor without using the heat detected by the thermal image sensor, whether or not the radio wave sensor detects the target object, while the thermal image sensor is OFF;
   turning the thermal image sensor ON and acquiring the heat detected by the thermal image sensor, only when the processor determines that the radio wave sensor does not detect the target object, wherein the thermal image sensor remains OFF when it is determined that the radio wave sensor detects the target object; and
   determining that the target object is present when it is determined that the thermal image sensor detects the heat generated by the target object after the processor determined that the radio wave sensor does not detect the target object, wherein the radio wave sensor remains ON while the thermal image sensor is turned ON.

2. The system according to claim 1, wherein the radio wave sensor is always ON, and the thermal image sensor always remains OFF as long as the processor determines that the radio wave sensor detects the target object.

3. The system according to claim 1, wherein the system includes a first state period, in which the radio wave sensor is ON and the thermal image sensor is OFF, and a second state period, in which the radio wave sensor is ON and the thermal image sensor is ON, but does not include a third state period in which the radio wave sensor is OFF and thermal image sensor is ON.

4. The system according to claim 3, wherein the first state period continues as long as the processor determines that the radio wave sensor detects the target object, and the second state period only occurs after the processor determines that the radio wave sensor does not detect the target object.

5. The system according to claim 1, wherein the processor acquires the reflected waves from the radio wave sensor periodically or by an instruction input by a user.

6. The system according to claim 5, wherein the processor determines whether or not the radio wave sensor detects the target object, each time when the processor acquires the reflected waves detected by the radio wave sensor.

7. The system according to claim 1, wherein it is determined whether the thermal image sensor detects the heat generated by the target object only after when it is determined that the radio wave sensor does not detect the target object.

8. A method for detecting a target object comprising:

outputting detected information from a radio wave sensor that emits radio waves and detects reflected waves that are the emitted radio waves reflected by a target object, the detected information including the reflected waves detected by the radio wave;

outputting detected information from a thermal image sensor that detects heat generated by the target object, the detected information including heat detected by thermal image sensor;

causing a processor to acquire the reflected waves detected by the radio wave sensor, while the thermal image sensor is OFF, causing the processor to determine, on the basis of the acquired reflected waves detected by the radio wave sensor without using the heat detected by the thermal image sensor, whether or not the radio wave sensor detects the target object is present, while the thermal image sensor is OFF; and causing the processor to turn ON the thermal image sensor and to acquire the heat detected by the thermal image sensor, only when it is determined that the radio wave sensor does not detect the target object, wherein the thermal image sensor remains OFF when it is determined that the radio wave sensor detects the target object, and causing the processor to determine that the target object is present when it is determined that the thermal image sensor detects the heat generated by the target object after the processor determined that the radio wave sensor does not detect the target object, wherein the radio wave sensor remains ON while the thermal image sensor is turned ON.

* * * * *